United States Patent [19]
Maeda

[11] 4,206,974
[45] Jun. 10, 1980

[54] HIGH RESOLUTION OBJECTIVE LENS SYSTEM

[75] Inventor: Haruo Maeda, Hino, Japan

[73] Assignee: Olympus Optical Co., Ltd., Tokyo, Japan

[21] Appl. No.: 930,015

[22] Filed: Aug. 1, 1978

[30] Foreign Application Priority Data

Aug. 11, 1977 [JP] Japan .................. 52-96275

[51] Int. Cl.² .................. G02B 9/62; G02B 9/61
[52] U.S. Cl. .................. 350/215; 350/214
[58] Field of Search .................. 350/215, 214

[56] References Cited

U.S. PATENT DOCUMENTS

| | | |
|---|---|---|
| 3,759,606 | 9/1973 | Van Orden .................. 350/214 |
| 3,773,403 | 11/1973 | Lechner et al. .................. 350/215 |
| 3,817,602 | 6/1974 | Kazamaki et al. .................. 350/214 |
| 4,080,048 | 3/1978 | Kimura .................. 350/214 |

*Primary Examiner*—Conrad J. Clark
*Attorney, Agent, or Firm*—Cushman, Darby & Cushman

[57] ABSTRACT

A high resolution objective lens system for ultra microfiché designed for a magnification of 1/150x~1/120x and comprising a first cemented lens component consisting of a positive lens element and a negative lens element, a second positive lens component, a third positive lens component, a fourth negative cemented lens component, a fifth positive lens component and a sixth cemented lens component consisting of a negative meniscus lens element and a positive meniscus lens element.

6 Claims, 6 Drawing Figures

HIGH RESOLUTION OBJECTIVE LENS SYSTEM

BACKGROUND OF THE INVENTION (a) Field of the Invention

The present invention relates to a high reduction ratio objective lens system for ultra microfiché.

(b) Description of the Prior Art

With the recent development of ultra microfiché, objective lens systems having high reduction ratios and high resolution are demanded. The conventional objective lens systems for microfiché were designed for magnification ratios on the order of 1/150x~1/120x and small film sizes. Further, for a reason to facilitate to correct aberrations, such objective lens systems had long focal lengths about 6 mm and long total lengths, and optical paths were bent by using large numbers of reflecting mirrors for preventing said lens systems from having long total lengths as final lens products due to long distance to object to be photographed. The conventional objective lens systems of this type therefore required a large number of optical members. It is therefore desirable to select a focal length as short as possible so as to make it possible to minimize conjugate distance and design a compact objective lens system. When a short focal length is selected, however, angle of field is apt to be widened on the object side to aggravate offaxial aberration so far as film size is kept constant. Further, working distance is shortened in proportion to the focal length, thereby making the lens system rather difficult to handle. In an objective lens system having such a short focal length, it will be obliged to impart strong refractive power to each lens component, thereby causing such defects as aggravation in aberrations. In order to eliminate these defects, it will be required to increase the number of lens components composing an objective lens system, thereby increasing number of machining steps and manufacturing cost.

SUMMARY OF THE INVENTION

A general object of the present invention is to provide a high reduction ratio objective lens system for microfiché which has a short focal length (approximately 4.1 mm), such a wide angle as to make the lens system usable at the same film size as the conventional microfiché, an image plane which is flat over a wide range, such high resolution as to assure an N. A. of 0.41 (on the image side) and a long working distance (exceeding 0.38f).

Figure 1:
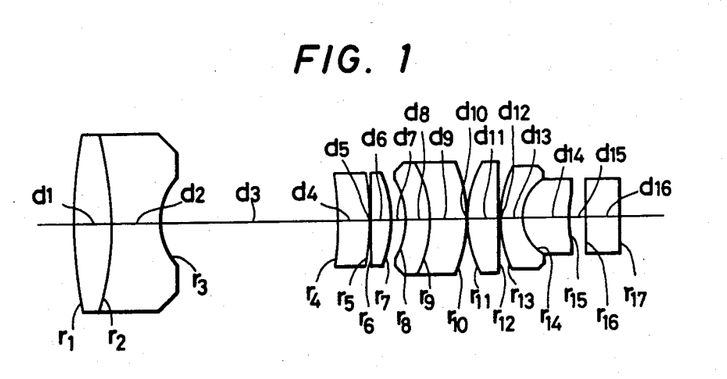
FIG. 1 shows a sectional view illustrating the composition of the high reduction ratio objective lens system according to the present invention.
Figure 2:
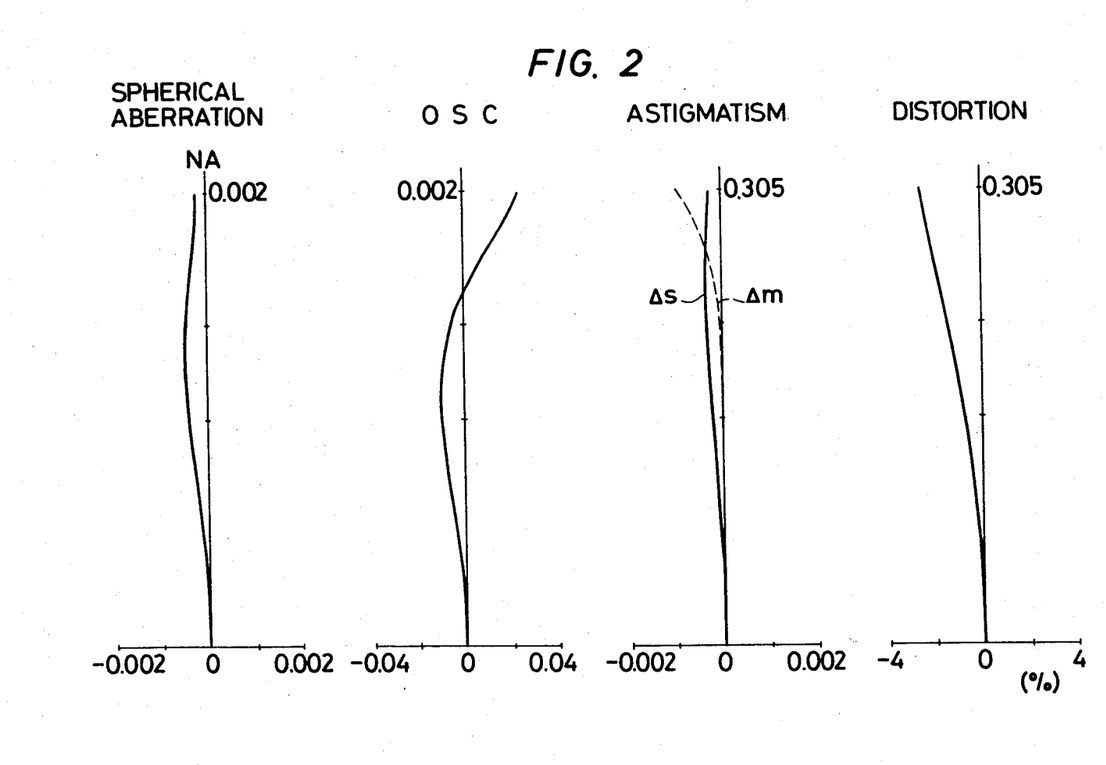
FIG. 2 shows curves illustrating the aberration characteristics of the Embodiment 1.
Figure 3:
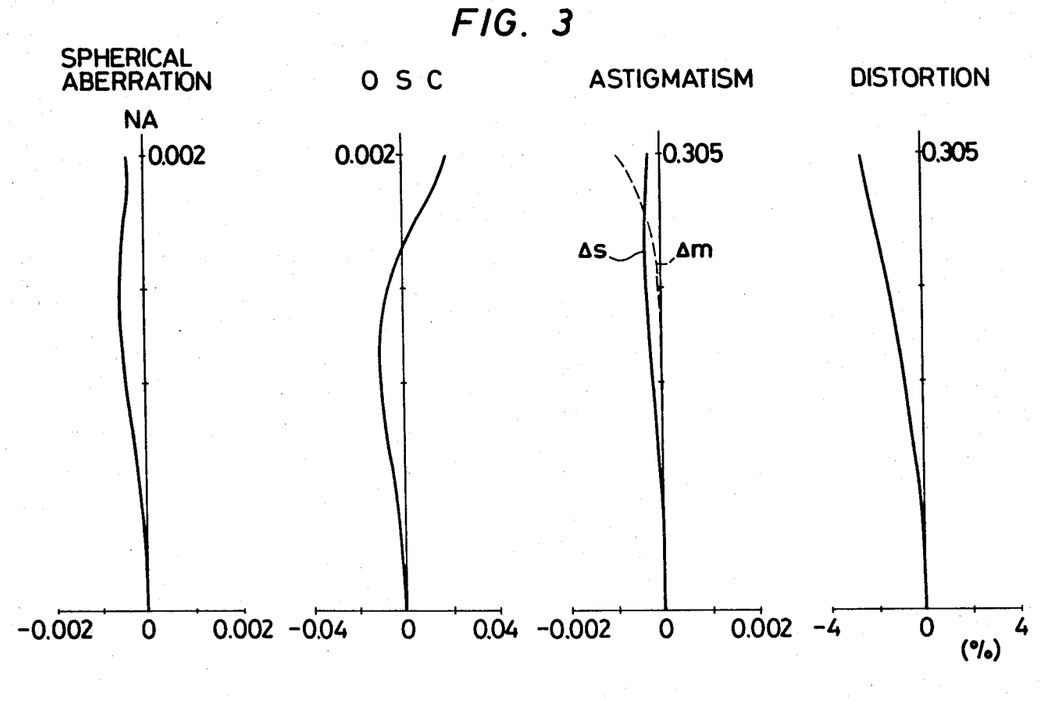
FIG. 3 illustrates curves visualizing the aberration characteristics of the Embodiment 2.
Figure 4:
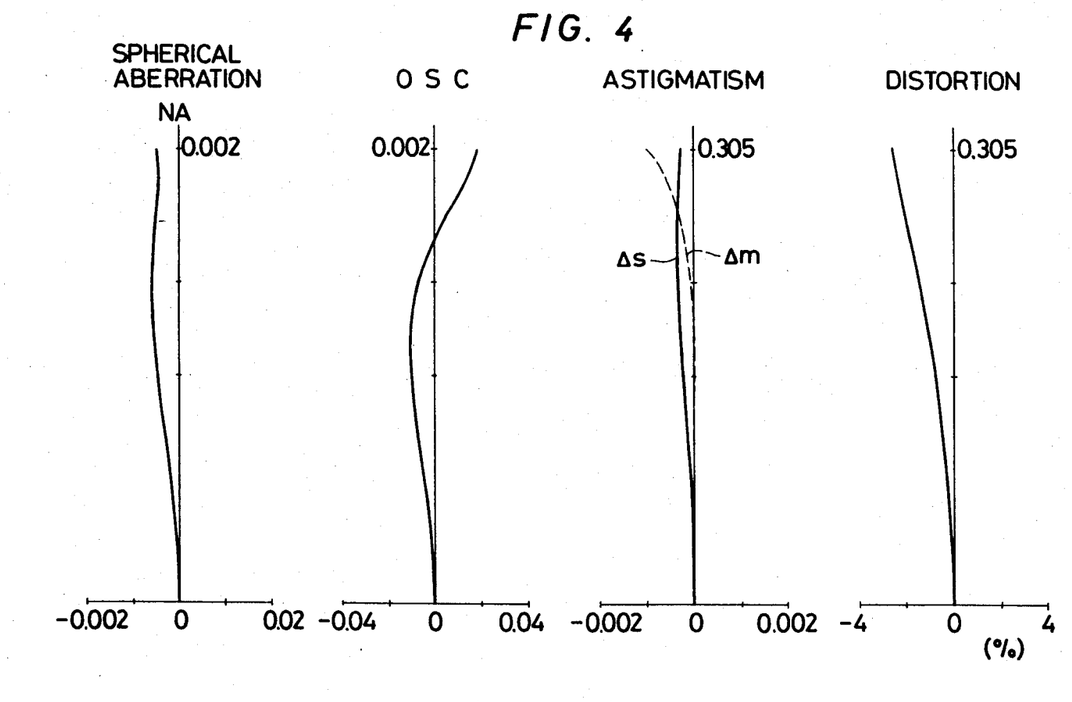
FIG. 4 illustrates graphs visualizing the aberration characteristics of the Embodiment 3.
Figure 5:
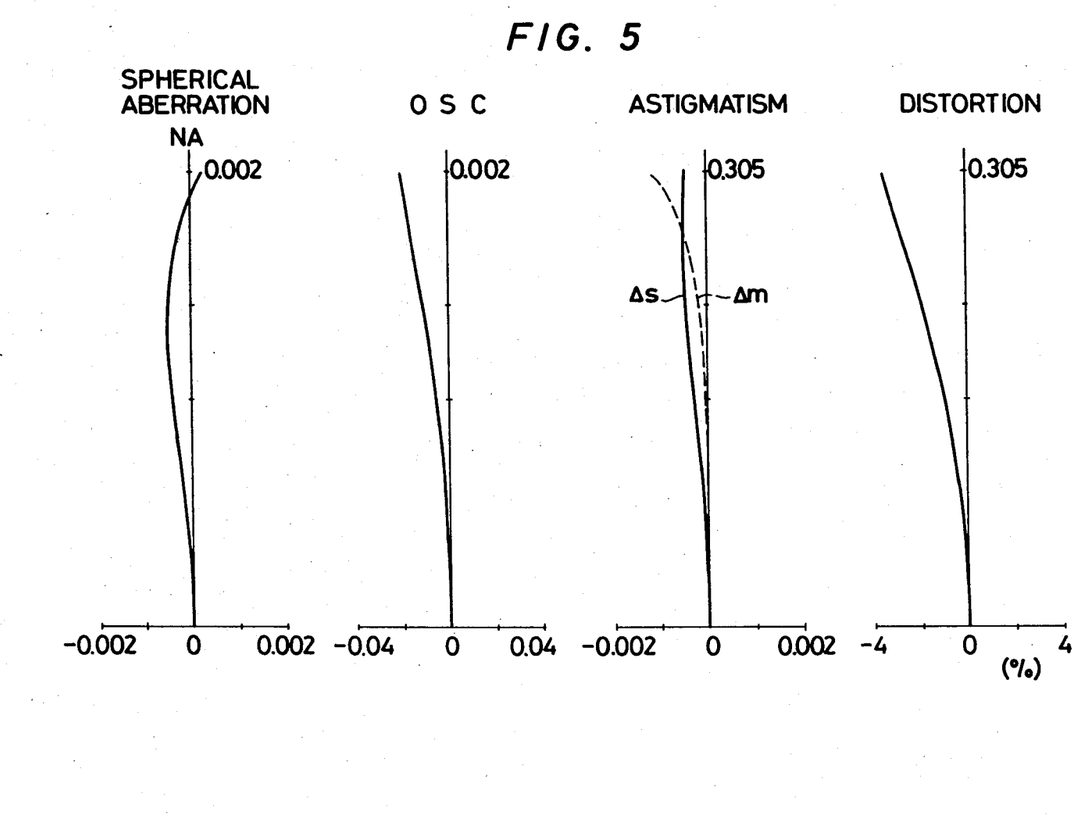
FIG. 5 shows graphs illustrating the aberration characteristics of the Embodiment 4.
Figure 6:
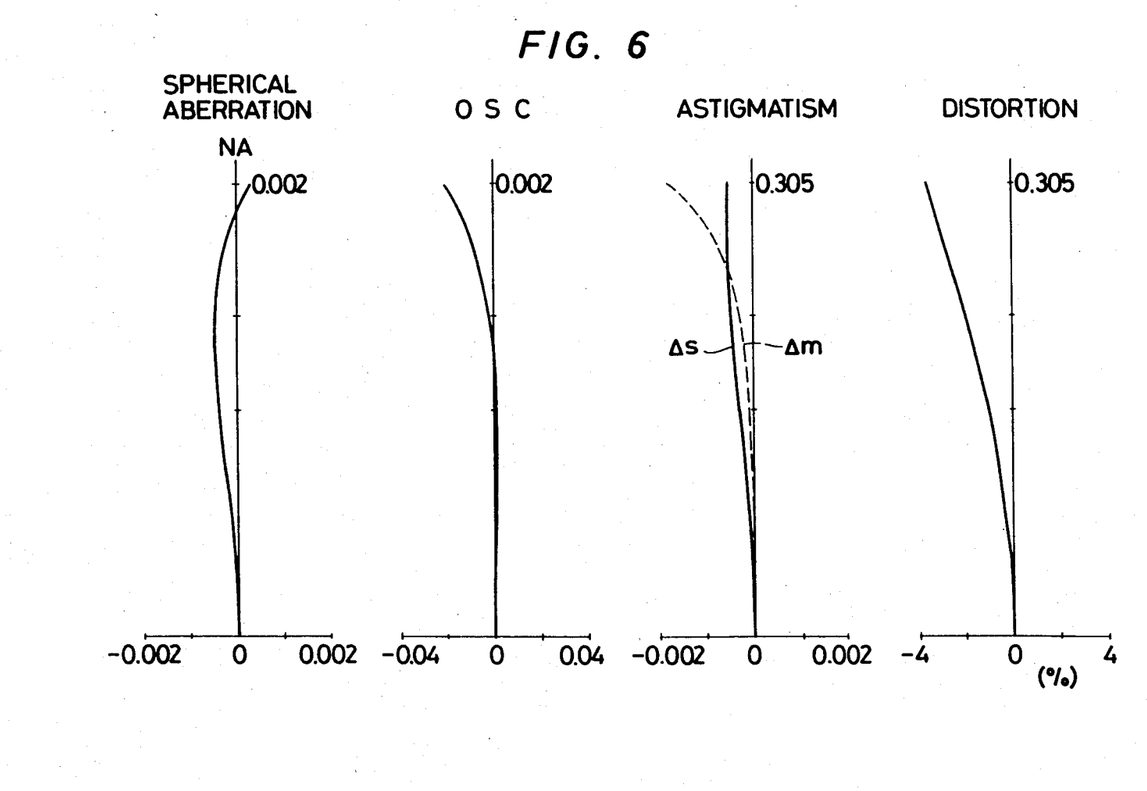
FIG. 6 shows graphs visualizing the aberration characteristics of the Embodiment 5.

The objective lens system according to the present invention has such a composition as shown in FIG. 1 and comprises a first negative cemented doublet lens component, a second positive lens component, a third positive lens component, a fourth negative cemented doublet lens component, a fifth positive lens component and a sixth positive cemented doublet lens component. In the lens system according to the present invention, the first negative lens component serves for improving image flatness and, at the same time, prolonging working distance, whereas the concave surface on the image side of the sixth lens component functions to minimize spherical aberration. Said objective lens system is characterized in that it satisfies the following conditions:

$$1.45f \leq d_7 + d_8 + d_9 \leq 2.0f \quad (1)$$

$$0.6 \leq |r_8|/|r_7| \leq 0.95 \quad (2)$$

$$3.6f \leq d_3 \leq 4.0f \quad (3)$$

$$1.0 \leq |r_8|/r_3 \leq 1.25 \quad (4)$$

wherein the reference symbols represent as defined below:

$r_3$: radius of curvature on the film side surface of the first lens component $r_7$: radius of curvature on the film side surface of the third lens component $r_8$: radius of curvature on the object side surface of the fourth lens component $d_3$: airspace between the first and second lens components $d_7$: airspace between the third and fourth lens components $d_8$ and $d_9$: thicknesses of the respective lens elements of the fourth cemented lens components $f$: focal length of the lens system as a whole Significance of these conditions will be described consecutively below. If $d_7 + d_8 + d_9$ is smaller than $1.45f$ in the condition (1), spherical aberration will be overcorrected. If $d_7 + d_8 + d_9$ is larger than $2.0f$, in contrast, spherical aberration will be undercorrected and, in addition, image quality will be degraded in the vicinity of the center of the image plane.

The condition (2) is necessary for favorably correcting spherical aberration for paraxial and offaxial rays. If $|r_8|/|r_7|$ is smaller than 0.6, spherical aberration will be undercorrected. If $|r_8|/|r_7|$ is larger than 0.95, in contrast, spherical aberration will be overcorrected.

The condition (3) serves for obtaining favorable image plane over its entire diameter (0.61f) by properly correcting curvature of the image plane. If $d_3$ is smaller than $3.6f$ in the condition (3), the image plane will be curved on the image side to remarkably aggravate aberration for the offaxial rays. If $d_3$ exceeds $4.0f$, in contrast, negative distortion will be produced.

The condition (4) is defined for correcting curvature of the image plane and spherical aberration. If $|r_8|/r_3$ is smaller than 1.0, the image plane will be curved on the negative side and, in addition, spherical aberration will be overcorrected. If $|r_8|/r_3$ exceeds 1.25, spherical aberration will be undercorrected. Further, it is possible to keep symmetrical coma by selecting the ratio within a range of $1.0 \leq |r_8|/r_3 \leq 1.25$

DETAILED DESCRIPTION OF THE PREFERRED EMBODIMENTS

Now, some preferred embodiments of the present invention will be described with reference to the accompanying drawings.

Embodiment 1

$f = 1$   $NA = 0.002$ (on the object side)   $\beta = -\frac{1}{205} \times$

| | | | |
|---|---|---|---|
| $r_1 = 11.5969$ | | | |
| | $d_1 = 0.8081$ | $n_1 = 1.81077$ | $\nu_1 = 40.95$ |
| $r_2 = -6.4072$ | | | |
| | $d_2 = 0.9975$ | $n_2 = 1.48915$ | $\nu_2 = 70.15$ |
| $r_3 = 1.2680$ | | | |
| | $d_3 = 3.8486$ | | |
| $r_4 = -6.2501$ | | | |
| | $d_4 = 0.7218$ | $n_3 = 1.48915$ | $\nu_3 = 70.15$ |
| $r_5 = -4.7718$ | | | |
| | $d_5 = 0.0264$ | | |
| $r_6 = -197.7081$ | | | |
| | $d_6 = 0.4820$ | $n_4 = 1.48915$ | $\nu_4 = 70.15$ |
| $r_7 = -1.7406$ | | | |
| | $d_7 = 0.2494$ | | |
| $r_8 = -1.5008$ | | | |
| | $d_8 = 0.5467$ | $n_5 = 1.76859$ | $\nu_5 = 26.55$ |
| $r_9 = -2.3650$ | | | |
| | $d_9 = 0.7985$ | $n_6 = 1.51977$ | $\nu_6 = 52.29$ |
| $r_{10} = -2.8252$ | | | |
| | $d_{10} = 0.0216$ | | |
| $r_{11} = 2.7576$ | | | |
| | $d_{11} = 0.6330$ | $n_7 = 1.69401$ | $\nu_7 = 54.84$ |
| $r_{12} = -20.4945$ | | | |
| | $d_{12} = 0.0288$ | | |
| $r_{13} = 2.1154$ | | | |
| | $d_{13} = 0.5012$ | $n_8 = 1.85501$ | $\nu_8 = 23.88$ |
| $r_{14} = 0.8393$ | | | |
| | $d_{14} = 0.9783$ | $n_9 = 1.73740$ | $\nu_9 = 51.52$ |
| $r_{15} = 2.3329$ | | | |
| | $d_{15} = 0.3844$ | | |
| $r_{16} = \infty$ | | | |
| | $d_{16} = 0.7625$ | $n_{10} = 1.52458$ | $\nu_{10} = 59.79$ |
| $r_{17} = \infty$ | | | |

$d_7 + d_8 + d_9 = 1.5946$   $\frac{r_8}{r_7} = 0.8622$ $d_3 = 3.8486$   $-\frac{r_8}{r_3} = 1.1836$

Embodiment 2

$f = 1$   $NA = 0.002$   $\beta = -\frac{1}{205} \times$

| | | | |
|---|---|---|---|
| $r_1 = 11.5632$ | | | |
| | $d_1 = 0.8184$ | $n_1 = 1.8077$ | $\nu_1 = 40.95$ |
| $r_2 = -6.4067$ | | | |
| | $d_2 = 0.9920$ | $n_2 = 1.48915$ | $\nu_2 = 70.15$ |
| $r_3 = 1.2679$ | | | |
| | $d_3 = 3.7581$ | | |
| $r_4 = -6.2515$ | | | |
| | $d_4 = 0.7481$ | $n_3 = 1.48915$ | $\nu_3 = 70.15$ |
| $r_5 = -4.7724$ | | | |
| | $d_5 = 0.0703$ | | |
| $r_6 = -134.4712$ | | | |
| | $d_6 = 0.5357$ | $n_4 = 1.48915$ | $\nu_4 = 70.15$ |
| $r_7 = -1.7387$ | | | |
| | $d_7 = 0.2515$ | | |
| $r_8 = -1.4983$ | | | |
| | $d_8 = 0.5709$ | $n_5 = 1.76859$ | $\nu_5 = 26.55$ |
| $r_9 = -2.3658$ | | | |
| | $d_9 = 0.7728$ | $n_6 = 1.51977$ | $\nu_6 = 52.29$ |
| $r_{10} = -2.8194$ | | | |
| | $d_{10} = 0.0211$ | | |
| $r_{11} = 2.7557$ | | | |
| | $d_{11} = 0.6472$ | $n_7 = 1.69401$ | $\nu_7 = 54.84$ |
| $r_{12} = -20.6165$ | | | |
| | $d_{12} = 0.0218$ | | |
| $r_{13} = 2.1151$ | | | |
| | $d_{13} = 0.4956$ | $n_8 = 1.85501$ | $\nu_8 = 23.88$ |
| $r_{14} = 0.8415$ | | | |
| | $d_{14} = 0.9862$ | $n_9 = 1.73740$ | $\nu_9 = 51.52$ |
| $r_{15} = 2.3340$ | | | |
| | $d_{15} = 0.3843$ | | |
| $r_{16} = \infty$ | | | |
| | $d_{16} = 0.7625$ | $n_{10} = 1.52458$ | $\nu_{10} = 59.79$ |
| $r_{17} = \infty$ | | | |

-continued

Embodiment 2

$f = 1$   $NA = 0.002$   $\beta = -\frac{1}{205} \times$ $d_7 + d_8 + d_9 = 1.5959$   $\frac{r_8}{r_7} = 0.8617$ $d_3 = 3.7581$   $-\frac{r_8}{r_3} = 1.1817$

Embodiment 3

$f = 1$   $NA = 0.002$   $\beta = -\frac{1}{205} \times$

| | | | |
|---|---|---|---|
| $r_1 = 11.5434$ | | | |
| | $d_1 = 0.8167$ | $n_1 = 1.81077$ | $\nu_1 = 40.95$ |
| $r_2 = -6.3375$ | | | |
| | $d_2 = 0.9796$ | $n_2 = 1.48915$ | $\nu_2 = 70.15$ |
| $r_3 = 1.2632$ | | | |
| | $d_3 = 3.7620$ | | |
| $r_4 = -6.4855$ | | | |
| | $d_4 = 0.7489$ | $n_3 = 1.48915$ | $\nu_3 = 70.15$ |
| $r_5 = -4.8050$ | | | |
| | $d_5 = 0.0729$ | | |
| $r_6 = -215.4324$ | | | |
| | $d_6 = 0.5416$ | $n_4 = 1.48915$ | $\nu_4 = 70.15$ |
| $r_7 = -1.7474$ | | | |
| | $d_7 = 0.2593$ | | |
| $r_8 = -1.4986$ | | | |
| | $d_8 = 0.5601$ | $n_5 = 1.76859$ | $\nu_5 = 26.55$ |
| $r_9 = -2.2852$ | | | |
| | $d_9 = 0.7712$ | $n_6 = 1.51977$ | $\nu_6 = 52.29$ |
| $r_{10} = -2.8426$ | | | |
| | $d_{10} = 0.0211$ | | |
| $r_{11} = 2.6937$ | | | |
| | $d_{11} = 0.6433$ | $n_7 = 1.69401$ | $\nu_7 = 54.84$ |
| $r_{12} = -21.8704$ | | | |
| | $d_{12} = 0.0221$ | | |
| $r_{13} = 2.1056$ | | | |
| | $d_{13} = 0.4764$ | $n_8 = 1.85501$ | $\nu_8 = 23.88$ |
| $r_{14} = 0.8328$ | | | |
| | $d_{14} = 0.9772$ | $n_9 = 1.73740$ | $\nu_9 = 51.52$ |
| $r_{15} = 2.2883$ | | | |
| | $d_{15} = 0.3838$ | | |
| $r_{16} = \infty$ | | | |
| | $d_{16} = 0.7625$ | $n_{10} = 1.52458$ | $\nu_{10} = 59.79$ |
| $r_{17} = \infty$ | | | |

$d_7 + d_8 + d_9 = 1.5906$   $\frac{r_8}{r_7} 0.8576$ $d_3 = 3.7620$   $-\frac{r_8}{r_3} 1.1864$

Embodiment 4

$f = 1$   $NA = 0.002$   $\beta = -\frac{1}{205} \times$

| | | | |
|---|---|---|---|
| $r_1 = 7.5727$ | | | |
| | $d_1 = 0.7860$ | $n_1 = 1.81077$ | $\nu_1 = 40.95$ |
| $r_2 = -7.2820$ | | | |
| | $d_2 = 0.6205$ | $n_2 = 1.48915$ | $\nu_2 = 70.15$ |
| $r_3 = 1.3246$ | | | |
| | $d_3 = 3.8641$ | | |
| $r_4 = -5.1561$ | | | |
| | $d_4 = 0.7477$ | $n_3 = 1.48915$ | $\nu_3 = 70.15$ |
| $r_5 = -3.3982$ | | | |
| | $d_5 = 0.1226$ | | |
| $r_6 = -19.7688$ | | | |
| | $d_6 = 0.7398$ | $n_4 = 1.48915$ | $\nu_4 = 70.15$ |
| $r_7 = -1.9570$ | | | |
| | $d_7 = 0.4977$ | | |
| $r_8 = -1.4290$ | | | |
| | $d_8 = 0.5520$ | $n_5 = 1.76859$ | $\nu_5 = 26.55$ |
| $r_9 = -8.0422$ | | | |
| | $d_9 = 0.8291$ | $n_6 = 1.51977$ | $\nu_6 = 52.29$ |
| $r_{10} = -2.3943$ | | | |
| | $d_{10} = 0.0639$ | | |
| $r_{11} = 6.0620$ | | | |

-continued

Embodiment 4

$f = 1 \quad NA = 0.002 \quad \beta = -\frac{1}{205} \times$

| | | | |
|---|---|---|---|
| $r_{12} = -4.4366$ | $d_{11} = 0.7678$ | $n_7 = 1.69401$ | $\nu_7 = 54.84$ |
| $r_{13} = 1.6852$ | $d_{12} = 0.0132$ | | |
| $r_{14} = 1.0068$ | $d_{13} = 0.3556$ | $n_8 = 1.85501$ | $\nu_8 = 23.88$ |
| $r_{15} = 1.9470$ | $d_{14} = 1.0940$ | $n_9 = 1.73740$ | $\nu_9 = 51.52$ |
| $r_{16} = \infty$ | $d_{15} = 0.3828$ | | |
| $r_{17} = \infty$ | $d_{16} = 0.7625$ | $n_{10} = 1.52458$ | $\nu_{10} = 59.79$ |

$d_7 + d_8 + d_9 = 1.8788 \quad \frac{r_8}{r_7} = 0.7302$ $d_3 = 3.8641 \quad -\frac{r_8}{r_3} = 1.0788$

Embodiment 5

$f = 1 \quad NA = 0.002 \quad \beta = -\frac{1}{205} \times$

| | | | |
|---|---|---|---|
| $r_1 = 7.1753$ | $d_1 = 0.7859$ | $n_1 = 1.81077$ | $\nu_1 = 40.95$ |
| $r_2 = -7.3984$ | $d_2 = 0.6200$ | $n_2 = 1.48915$ | $\nu_2 = 70.15$ |
| $r_3 = 1.3239$ | $d_3 = 3.8635$ | | |
| $r_4 = -4.7164$ | $d_4 = 0.7483$ | $n_3 = 1.48915$ | $\nu_3 = 70.15$ |
| $r_5 = -3.4373$ | $d_5 = 0.1226$ | | |
| $r_6 = -16.7996$ | $d_6 = 0.7394$ | $n_4 = 1.48915$ | $\nu_4 = 70.15$ |
| $r_7 = -1.9391$ | $d_7 = 0.5005$ | | |
| $r_8 = -1.4351$ | $d_8 = 0.5556$ | $n_5 = 1.76859$ | $\nu_5 = 26.55$ |
| $r_9 = -5.8964$ | $d_9 = 0.8323$ | $n_6 = 1.51977$ | $\nu_6 = 52.29$ |
| $r_{10} = -2.4089$ | $d_{10} = 0.0656$ | | |
| $r_{11} = 6.1866$ | $d_{11} = 0.7674$ | $n_7 = 1.69401$ | $\nu_7 = 54.84$ |
| $r_{12} = -4.6018$ | $d_{12} = 0.0127$ | | |
| $r_{13} = 1.6696$ | $d_{13} = 0.3555$ | $n_8 = 1.85501$ | $\nu_8 = 23.88$ |
| $r_{14} = 1.0213$ | $d_{14} = 1.0872$ | $n_9 = 1.73740$ | $\nu_9 = 51.52$ |
| $r_{15} = 1.9776$ | $d_{15} = 0.3823$ | | |
| $r_{16} = \infty$ | $d_{16} = 0.7625$ | $n_{10} = 1.52458$ | $\nu_{10} = 59.79$ |
| $r_{17} = \infty$ | | | |

$d_7 + d_8 + d_9 = 1.8884 \quad \frac{r_8}{r_7} = 0.7401$ $d_3 = 3.8635 \quad -\frac{r_8}{r_3} = 1.0840$ wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements relative to e line and the reference symbols $\nu_1$ through $\nu_{10}$ represent Abbe's numbers of the respective lens elements relative to d line.

Of the Embodiments described above, Embodiments 1 through 3 comprise a fourth lens component which is a cemented doublet consisting of a negative meniscus lens element and a negative meniscus lens element, whereas the Embodiments 4 and 5 use a fourth lens component which is a cemented doublet consisting of a negative meniscus lens element and a positive mensicus lens element. When a negative meniscus lens element is used as the image side element of the fourth lens component, a positive lens component having highly refractive surface on the object side is adopted as the fifth lens component. When a positive meniscus lens element is used as the image side element of the fourth lens component, in contrast, a positive lens component having a highly refractive surface on the image side is adopted as the fifth lens component.

A cover glass is additionally illustrated in FIG. 1 wherein the reference symbols $r_{16}$ and $r_{17}$ represent the surfaces on both the sides of said cover glass, the reference symbol $d_{16}$ designates thickness of said cover glass, the reference symbols $n_{10}$ and $\nu_{10}$ denote refractive index and Abbe's number of said cover glass. In addition, it should be noted that the objective lens system according to the present invention is designed on the basis of e line taken as standard for considering film sensitivity, filter sensitivity, luminosity and other factors. Therefore, the aberration characteristic curves shown in FIG. 2 through FIG. 6 are traced with regard to e line.

I claim:

1. A high reduction ratio objective lens system comprising a first cemented doublet lens component consisting of a positive lens element and a negative lens element, a second positive lens component, a third positive lens component, a fourth negative cemented doublet lens component, a fifth positive lens component and a sixth cemented doublet lens component consisting of a negative meniscus lens element having a convex surface on the object side and a positive thick meniscus lens element, and said lens system satisfying the following conditions:

$1.45f \leq d_7 + d_8 + d_9 \leq 2.0f$ (1)

$0.6 \leq |r_8|/|r_7| \leq 0.95$ (2)

$3.6f \leq d_3 \leq 4.0f$ (3)

$1.0 \leq |r_8|/r_3 \leq 1.25$ (4)

wherein the reference symbols $r_3$, $r_7$ and $r_8$ represent radii of curvature on the film side surface of the first lens component, the film side surface of the third lens component and the object side surface of the fourth lens component respectively, the reference symbols $d_3$ and $d_7$ designate airspace between the first and second lens components and that between the third and fourth lens components respectively, the reference symbols $d_8$ and $d_9$ denote thicknesses of the respective lens elements of the fourth lens component and the reference symbol f represents focal length of the lens system as a whole.

2. A high reduction ratio objective lens system according to claim 1 having the following numerical data:

$f = 1 \quad NA = 0.002 \text{ (on the object side)} \quad \beta = -\frac{1}{205} \times$

| | | | |
|---|---|---|---|
| $r_1 = 11.5969$ | $d_1 = 0.8081$ | $n_1 = 1.81077$ | $\nu_1 = 40.95$ |
| $r_2 = -6.4072$ | $d_2 = 0.9975$ | $n_2 = 1.48915$ | $\nu_2 = 70.15$ |
| $r_3 = 1.2680$ | | | |

-continued

| $f = 1$ | NA = 0.002 (on the object side) | $\beta = -\frac{1}{205} \times$ | | |
|---|---|---|---|---|
| | $d_3 = 3.8486$ | | | |
| $r_4 = -6.2501$ | | | | |
| | $d_4 = 0.7218$ | $n_3 = 1.48915$ | $\nu_3 = 70.15$ | |
| $r_5 = -4.7718$ | | | | |
| | $d_5 = 0.0264$ | | | |
| $r_6 = -197.7081$ | | | | |
| | $d_6 = 0.4820$ | $n_4 = 1.48915$ | $\nu_4 = 70.15$ | |
| $r_7 = -1.7406$ | | | | |
| | $d_7 = 0.2494$ | | | |
| $r_8 = -1.5008$ | | | | |
| | $d_8 = 0.5467$ | $n_5 = 1.76859$ | $\nu_5 = 26.55$ | |
| $r_9 = -2.3650$ | | | | |
| | $d_9 = 0.7985$ | $n_6 = 1.51977$ | $\nu_6 = 52.29$ | |
| $r_{10} = -2.8252$ | | | | |
| | $d_{10} = 0.0216$ | | | |
| $r_{11} = 2.7576$ | | | | |
| | $d_{11} = 0.6330$ | $n_7 = 1.69401$ | $\nu_7 = 54.84$ | |
| $r_{12} = -20.4945$ | | | | |
| | $d_{12} = 0.0288$ | | | |
| $r_{13} = 2.1154$ | | | | |
| | $d_{13} = 0.5012$ | $n_8 = 1.85501$ | $\nu_8 = 23.88$ | |
| $r_{14} = 0.8393$ | | | | |
| | $d_{14} = 0.9783$ | $n_9 = 1.73740$ | $\nu_9 = 51.52$ | |
| $r_{15} = 2.3329$ | | | | |
| | $d_{15} = 0.3844$ | | | |
| $r_{16} = \infty$ | | | | |
| | $d_{16} = 0.7625$ | $n_{10} = 1.52458$ | $\nu_{10} = 59.79$ | |
| $r_{17} = \infty$ | | | | |
| | $d_7 + d_8 + d_9 = 1.5946$ | $\frac{r_8}{r_7} = 0.8622$ | | |
| | $d_3 = 3.8486$ | $-\frac{r_8}{r_3} = 1.1836$ | | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol f designates focal length of the lens system as a whole, the reference symbol N.A. denotes numerical aperture on the object side and the reference symbol $\beta$ represents magnification.

3. A high reduction ratio objective lens system according to claim 1 having the following numerical data:

| $f = 1$ | NA = 0.002 | $\beta = -\frac{1}{205} \times$ | | |
|---|---|---|---|---|
| $r_1 = 11.5632$ | | | | |
| | $d_1 = 0.8184$ | $n_1 = 1.81077$ | $\nu_1 = 40.95$ | |
| $r_2 = -6.4067$ | | | | |
| | $d_2 = 0.9920$ | $n_2 = 1.48915$ | $\nu_2 = 70.15$ | |
| $r_3 = 1.2679$ | | | | |
| | $d_3 = 3.7581$ | | | |
| $r_4 = -6.2515$ | | | | |
| | $d_4 = 0.7481$ | $n_3 = 1.48915$ | $\nu_3 = 70.15$ | |
| $r_5 = -4.7724$ | | | | |
| | $d_5 = 0.0703$ | | | |
| $r_6 = -134.4712$ | | | | |
| | $d_6 = 0.5357$ | $n_4 = 1.48915$ | $\nu_4 = 70.15$ | |
| $r_7 = -1.7387$ | | | | |
| | $d_7 = 0.2515$ | | | |
| $r_8 = -1.4983$ | | | | |
| | $d_8 = 0.5709$ | $n_5 = 1.76859$ | $\nu_5 = 26.55$ | |
| $r_9 = -2.3658$ | | | | |
| | $d_9 = 0.7728$ | $n_6 = 1.51977$ | $\nu_6 = 52.29$ | |
| $r_{10} = -2.8194$ | | | | |
| | $d_{10} = 0.0211$ | | | |
| $r_{11} = 2.7557$ | | | | |
| | $d_{11} = 0.6472$ | $n_7 = 1.69401$ | $\nu_7 = 54.84$ | |
| $r_{12} = -20.6165$ | | | | |
| | $d_{12} = 0.0218$ | | | |
| $r_{13} = 2.1151$ | | | | |
| | $d_{13} = 0.4956$ | $n_8 = 1.85501$ | $\nu_8 = 23.88$ | |
| $r_{14} = 0.8415$ | | | | |
| | $d_{14} = 0.9862$ | $n_9 = 1.73740$ | $\nu_9 = 51.52$ | |
| $r_{15} = 2.3340$ | | | | |
| | $d_{15} = 0.3843$ | | | |
| $r_{16} = \infty$ | | | | |
| | $d_{16} = 0.7625$ | $n_{10} = 1.52458$ | $\nu_{10} = 59.79$ | |
| $r_{17} = \infty$ | | | | |
| | $d_7 + d_8 + d_9 = 1.5959$ | $\frac{r_8}{r_7} = 0.8617$ | | |
| | $d_3 = 3.7581$ | $-\frac{r_8}{r_3} = 1.1817$ | | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol f designates focal length of the lens system as a whole, the reference symbol N.A. denotes numerical aperture on the object side and the reference symbol $\beta$ represents magnification.

4. A high reduction ratio objective lens system according to claim 1 having the following numerical data:

| $f = 1$ | NA = 0.002 | $\beta = -\frac{1}{205} \times$ | | |
|---|---|---|---|---|
| $r_1 = 11.5434$ | | | | |
| | $d_1 = 0.8167$ | $n_1 = 1.81077$ | $\nu_1 = 40.95$ | |
| $r_2 = -6.3375$ | | | | |
| | $d_2 = 0.9796$ | $n_2 = 1.48915$ | $\nu_2 = 70.15$ | |
| $r_3 = 1.2632$ | | | | |
| | $d_3 = 3.7620$ | | | |
| $r_4 = -6.4855$ | | | | |
| | $d_4 = 0.7489$ | $n_3 = 1.48915$ | $\nu_3 = 70.15$ | |
| $r_5 = -4.8050$ | | | | |
| | $d_5 = 0.0729$ | | | |
| $r_6 = -215.4342$ | | | | |
| | $d_6 = 0.5416$ | $n_4 = 1.48915$ | $\nu_4 = 70.15$ | |
| $r_7 = -1.7474$ | | | | |
| | $d_7 = 0.2593$ | | | |
| $r_8 = -1.4986$ | | | | |
| | $d_8 = 0.5601$ | $n_5 = 1.76859$ | $\nu_5 = 26.55$ | |
| $r_9 = -2.2852$ | | | | |
| | $d_9 = 0.7712$ | $n_6 = 1.51977$ | $\nu_6 = 52.29$ | |
| $r_{10} = -2.8426$ | | | | |
| | $d_{10} = 0.0211$ | | | |
| $r_{11} = 2.6937$ | | | | |
| | $d_{11} = 0.6433$ | $n_7 = 1.69401$ | $\nu_7 = 54.84$ | |
| $r_{12} = -21.8704$ | | | | |
| | $d_{12} = 0.0221$ | | | |
| $r_{13} = 2.1056$ | | | | |
| | $d_{13} = 0.4764$ | $n_8 = 1.85501$ | $\nu_8 = 23.88$ | |
| $r_{14} = 0.8328$ | | | | |
| | $d_{14} = 0.9772$ | $n_9 = 1.73740$ | $\nu_9 = 51.52$ | |
| $r_{15} = 2.2883$ | | | | |
| | $d_{15} = 0.3838$ | | | |
| $r_{16} = \infty$ | | | | |
| | $d_{16} = 0.7625$ | $n_{10} = 1.52458$ | $\nu_{10} = 59.79$ | |
| $r_{17} = \infty$ | | | | |
| | $d_7 + d_8 + d_9 = 1.5906$ | $\frac{r_8}{r_7} = 0.8576$ | | |

-continued $$f = 1 \quad NA = 0.002 \quad \beta = -\frac{1}{205} \times$$

| | |
|---|---|
| $d_3 = 3.7620$ | $-\frac{r_8}{r_3} 1.1864$ | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol f designates focal length of the lens system as a whole, the reference symbol N.A. denotes numerical aperture on the object side and the reference symbol $\beta$ represents magnification.

5. A high reduction ratio objective lens system according to claim 1 having the following numerical data:

$$f = 1 \quad NA = 0.002 \quad \beta = -\frac{1}{205} \times$$

| | | | |
|---|---|---|---|
| $r_1 = 7.5727$ | | | |
| | $d_1 = 0.7860$ | $n_1 = 1.81077$ | $\nu_1 = 40.95$ |
| $r_2 = -7.2820$ | | | |
| | $d_2 = 0.6205$ | $n_2 = 1.48915$ | $\nu_2 = 70.15$ |
| $r_3 = 1.3246$ | | | |
| | $d_3 = 3.8641$ | | |
| $r_4 = -5.1561$ | | | |
| | $d_4 = 0.7477$ | $n_3 = 1.48915$ | $\nu_3 = 70.15$ |
| $r_5 = -3.3982$ | | | |
| | $d_5 = 0.1226$ | | |
| $r_6 = -19.7688$ | | | |
| | $d_6 = 0.7398$ | $n_4 = 1.48915$ | $\nu_4 = 70.15$ |
| $r_7 = -1.9570$ | | | |
| | $d_7 = 0.4977$ | | |
| $r_8 = -1.4290$ | | | |
| | $d_8 = 0.5520$ | $n_5 = 1.76859$ | $\nu_5 = 26.55$ |
| $r_9 = -8.0422$ | | | |
| | $d_9 = 0.8291$ | $n_6 = 1.51977$ | $\nu_6 = 52.29$ |
| $r_{10} = -2.3943$ | | | |
| | $d_{10} = 0.0639$ | | |
| $r_{11} = 6.0620$ | | | |
| | $d_{11} = 0.7678$ | $n_7 = 1.69401$ | $\nu_7 = 54.84$ |
| $r_{12} = -4.4366$ | | | |
| | $d_{12} = 0.0132$ | | |
| $r_{13} = 1.6852$ | | | |
| | $d_{13} = 0.3556$ | $n_8 = 1.85501$ | $\nu_8 = 23.88$ |
| $r_{14} = 1.0068$ | | | |
| | $d_{14} = 1.0940$ | $n_9 = 1.73740$ | $\nu_9 = 51.52$ |
| $r_{15} = 1.9470$ | | | |
| | $d_{15} = 0.3828$ | | |
| $r_{16} = \infty$ | | | |
| | $d_{16} = 0.7625$ | $n_{10} = 1.52458$ | $\nu_{10} = 59.79$ |
| $r_{17} = \infty$ | | | |
| $d_7 + d_8 + d_9 = 1.8788$ | | $\frac{r_8}{r_7} = 0.7302$ | |
| $d_3 = 3.8641$ | | $-\frac{r_8}{r_3} = 1.0788$ | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol f designates focal length of the lens system as a whole, the reference symbol N.A. denotes numerical aperture on the object side and the reference symbol $\beta$ represents magnification.

6. A high reduction ratio objective lens system according to claim 1 having the following numerical data:

$$f = 1 \quad NA = 0.002 \quad \beta = -\frac{1}{205} \times$$

| | | | |
|---|---|---|---|
| $r_1 = 7.1753$ | | | |
| | $d_1 = 0.7859$ | $n_1 = 1.81077$ | $\nu_1 = 40.95$ |
| $r_2 = -7.3984$ | | | |
| | $d_2 = 0.6200$ | $n_2 = 1.48915$ | $\nu_2 = 70.15$ |
| $r_3 = 1.3239$ | | | |
| | $d_3 = 3.8635$ | | |
| $r_4 = -4.7164$ | | | |
| | $d_4 = 0.7483$ | $n_3 = 1.48915$ | $\nu_3 = 70.15$ |
| $r_5 = -3.4373$ | | | |
| | $d_5 = 0.1226$ | | |
| $r_6 = -16.7996$ | | | |
| | $d_6 = 0.7394$ | $n_4 = 1.48915$ | $\nu_4 = 70.15$ |
| $r_7 = -1.9391$ | | | |
| | $d_7 = 0.5005$ | | |
| $r_8 = -1.4351$ | | | |
| | $d_8 = 0.5556$ | $n_5 = 1.76859$ | $\nu_5 = 26.55$ |
| $r_9 = -5.8964$ | | | |
| | $d_9 = 0.8323$ | $n_6 = 1.51977$ | $\nu_6 = 52.29$ |
| $r_{10} = -2.4089$ | | | |
| | $d_{10} = 0.0656$ | | |
| $r_{11} = 6.1866$ | | | |
| | $d_{11} = 0.7674$ | $n_7 = 1.69401$ | $\nu_7 = 54.84$ |
| $r_{12} = -4.6018$ | | | |
| | $d_{12} = 0.0127$ | | |
| $r_{13} = 1.6696$ | | | |
| | $d_{13} = 0.3555$ | $n_8 = 1.85501$ | $\nu_8 = 23.88$ |
| $r_{14} = 1.0213$ | | | |
| | $d_{14} = 1.0872$ | $n_9 = 1.73740$ | $\nu_9 = 51.52$ |
| $r_{15} = 1.9776$ | | | |
| | $d_{15} = 0.3823$ | | |
| $r_{16} = \infty$ | | | |
| | $d_{16} = 0.7625$ | $n_{10} = 1.52458$ | $\nu_{10} = 59.79$ |
| $r_{17} = \infty$ | | | |
| $d_7 + d_8 + d_9 = 1.8884$ | | $\frac{r_8}{r_7} = 0.7401$ | |
| $d_3 = 3.8635$ | | $-\frac{r_8}{r_3} = 1.0840$ | | wherein the reference symbols $r_1$ through $r_{17}$ represent radii of curvature on the surfaces of the respective lens elements, the reference symbols $d_1$ through $d_{16}$ designate thicknesses of the respective lens elements and airspaces therebetween, the reference symbols $n_1$ through $n_{10}$ denote refractive indices of the respective lens elements, the reference symbols $\nu_1$ through $\nu_{10}$ represent Abbe's numbers of the respective lens elements, the reference symbol f designates focal length of the lens system as a whole, the reference symbol N.A. denotes numerical aperture on the object side and the reference symbol $\beta$ represents magnification.

* * * * *